(12) United States Patent
Miyake

(10) Patent No.: US 6,227,484 B1
(45) Date of Patent: May 8, 2001

(54) TETHERED BALLOON

(75) Inventor: Kunihide Miyake, Koriyama (JP)

(73) Assignees: Dentsu Tec Inc., Tokyo; VIP Corporation Co., Ltd., Fukushima, both of (JP)

( * ) Notice: Subject to any disclaimer, the term of this patent is extended or adjusted under 35 U.S.C. 154(b) by 0 days.

(21) Appl. No.: 09/237,846

(22) Filed: Jan. 27, 1999

(30) Foreign Application Priority Data

Jan. 28, 1998 (JP) .................................................. 10-015196

(51) Int. Cl.⁷ ........................................................ B64B 1/42
(52) U.S. Cl. ............................ 244/31; 244/33; 244/115; 244/30
(58) Field of Search ................................ 244/33, 31, 115, 244/116, 24, 96, 30, 29, 26

(56) References Cited

U.S. PATENT DOCUMENTS

| | | | |
|---|---|---|---|
| 1,270,945 | * | 7/1918 | Hawrylasz . |
| 2,954,187 | * | 9/1960 | Winzen . |
| 3,834,655 | | 9/1974 | Crosby, Jr. . |
| 5,082,205 | * | 1/1992 | Caufman . |
| 5,429,325 | * | 7/1995 | Hunt . |
| 5,857,760 | * | 1/1999 | Pelton . |

FOREIGN PATENT DOCUMENTS

| | | | | |
|---|---|---|---|---|
| 1282164 | * | 6/1962 | (FR) | ........................................ 244/33 |
| 2630397 | * | 10/1989 | (FR) | ........................................ 244/96 |
| 109033 | | 6/1934 | (JP) . | |
| 230490 | * | 8/1992 | (JP) | ........................................ 244/31 |
| 8-198188 | | 8/1996 | (JP) . | |

* cited by examiner

Primary Examiner—Charles T. Jordan
Assistant Examiner—Tien Dinh
(74) Attorney, Agent, or Firm—Wenderoth, Lind & Ponack, LLP.

(57) ABSTRACT

A tethered balloon having a spherical balloon proper inflated with a gas whose specific gravity is lower than that of the outside air, a gondola attached to the bottom of the balloon proper, a vertical stabilizer attached to the balloon proper, a connecting assembly attached to the balloon proper, a tether connected to the connecting assembly, and a tether holder having a drum to take up and pay off the tether and placed on the ground. The connecting assembly is positioned opposite to the vertical stabilizer with the gondola disposed in between. A straight line connecting the center of the balloon proper and the connecting assembly is inclined with respect to the central axis of the balloon connecting the center of the balloon proper and the center of gravity of the whole balloon. The balloon is transversely stable because little force acts on the balloon in a direction perpendicular to the wind. The balloon also does not sway much in the direction of the wind because the straight line is inclined with respect to the central axis of the balloon.

6 Claims, 6 Drawing Sheets

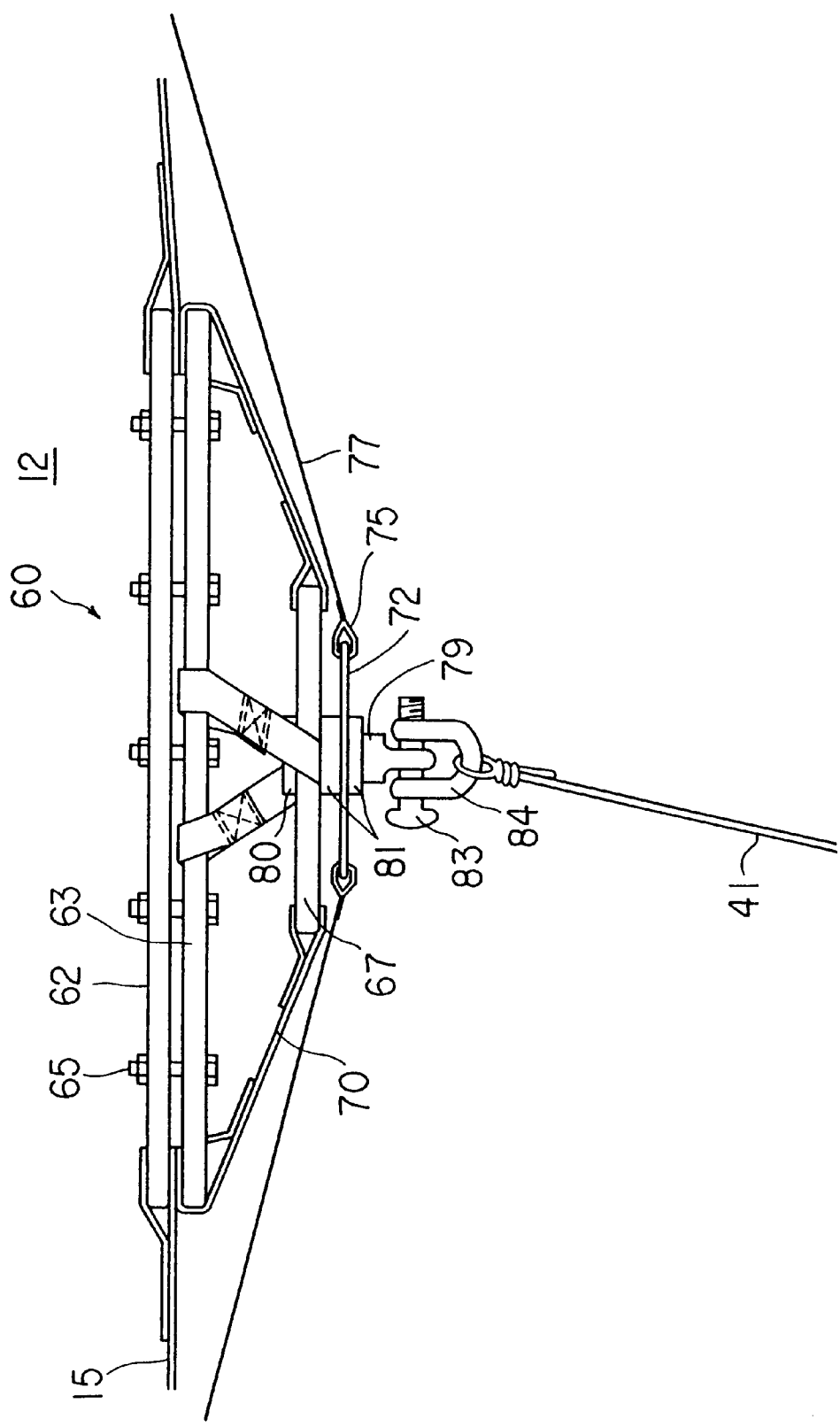

TETHERED BALLOON

BACKGROUND OF THE INVENTION

This invention relates to tethered balloons used for aerial film or video recording, advertisements, shows and other activities done in the air and more particularly to tethered balloons used at relatively low altitudes (between 30 and 150 m).

Telecasting of ball games, film or video recording, advertisements, shows and other activities are often carried out at a fixed point in the air. These activities are carried out by using helicopters, airships and tethered balloons that can remain floating in the air. However, helicopters cannot remain floating at any given point in the air for a prolonged period of time. Besides, they produce large noises and vibrations. Airships and tethered balloons cannot be used when strong winds are blowing (at a speed of, for example, 7 meters per second or above) because they roll and pitch considerably. Tethered balloons usually employ a connecting net so that the tethering load acting on the balloon proper (or the floating power of the balloon) does not concentrate at the joint where the balloon proper and tether are connected together. The connecting net is a cone formed by multiple connecting ropes that are attached to the balloon proper at the bottom of the cone. The stationary satellite balloon contrived by the inventor is an example of the tethered balloons of the type just described (see Japanese Provisional Patent Publication No. 198188 of 1996).

Conventional tethered balloons have a connecting net that extends vertically down. In the presence of strong winds, therefore, they sway back and forth (in the direction of wind), lose their stability and sometimes crash against the ground. The connecting net extending vertically down gets into the field of vision of the camera used for bird's-eye view film or video recording, as well.

SUMMARY OF THE INVENTION

An object of this invention is to provide a tethered balloon that can remain stable even in the presence of strong winds. Another object of this invention is to provide a tethered balloon that permits bird's-eye view film or video recording from a high point in the air without being hindered by the connecting net.

A tethered balloon according to this invention comprises a spherical balloon proper inflated with a gas whose specific gravity is lower than that of the outside air, a gondola attached to the bottom of the balloon proper, a vertical stabilizer attached to the balloon proper, and a connector attached to the balloon proper. The connector being positioned opposite to the vertical stabilizer with the gondola in between and a straight line connecting the center of the balloon proper and the connector being inclined with respect to the central axis of the balloon that connects the center of the balloon proper and the center of gravity of the whole balloon. The tethered balloon also comprises a tether connected to the connector, and a tether holder having a drum to take up and pay off the tether and placed on the ground.

When wind blows, the tethered balloon of this invention thus constructed is positioned so that the vertical stabilizer lies parallel to the direction of wind. Because only a small force acts on the balloon perpendicular to the direction of wind (i.e. transversely), the balloon remains stable transversely. The balloon also sways little in the direction of wind (i.e. back and forth) because the straight line connecting the center of the balloon proper and the connector is inclined with respect to the central axis of the balloon that connects the center of the balloon proper and the center of gravity of the whole balloon. When taking an omnidirectional (covering 360 degrees) bird's-eye view photograph, the tether comes into the field of vision, but the connector remains outside.

Preferably, the connector is a connecting net made of multiple connecting ropes that are attached to the periphery of a circle on the surface of the balloon proper at one end and gathered together at the other end to form a conical shape. The connecting net is placed opposite to the vertical stabilizer with the gondola in between. A straight line connecting the center of the balloon proper and the apex of the conically shaped connecting net is inclined with respect to the central axis of the balloon that connects the center of the balloon proper and the center of gravity of the whole balloon. The tether is connected to the apex of the connecting net.

Preferably, the connector comprises a ring plate attached to the surface of the balloon proper and a metal connector to which the tether is connected. Provision may be made so that an air bag is placed in a spherical frame formed by horizontal and vertical belts and the ring plate is attached to the balloon proper by the vertical belts.

BRIEF DESCRIPTION OF THE DRAWINGS

FIG. 6 is a side elevation of the portion shown in FIG. 5.

DESCRIPTION OF THE PREFERRED EMBODIMENTS

Figure 1:
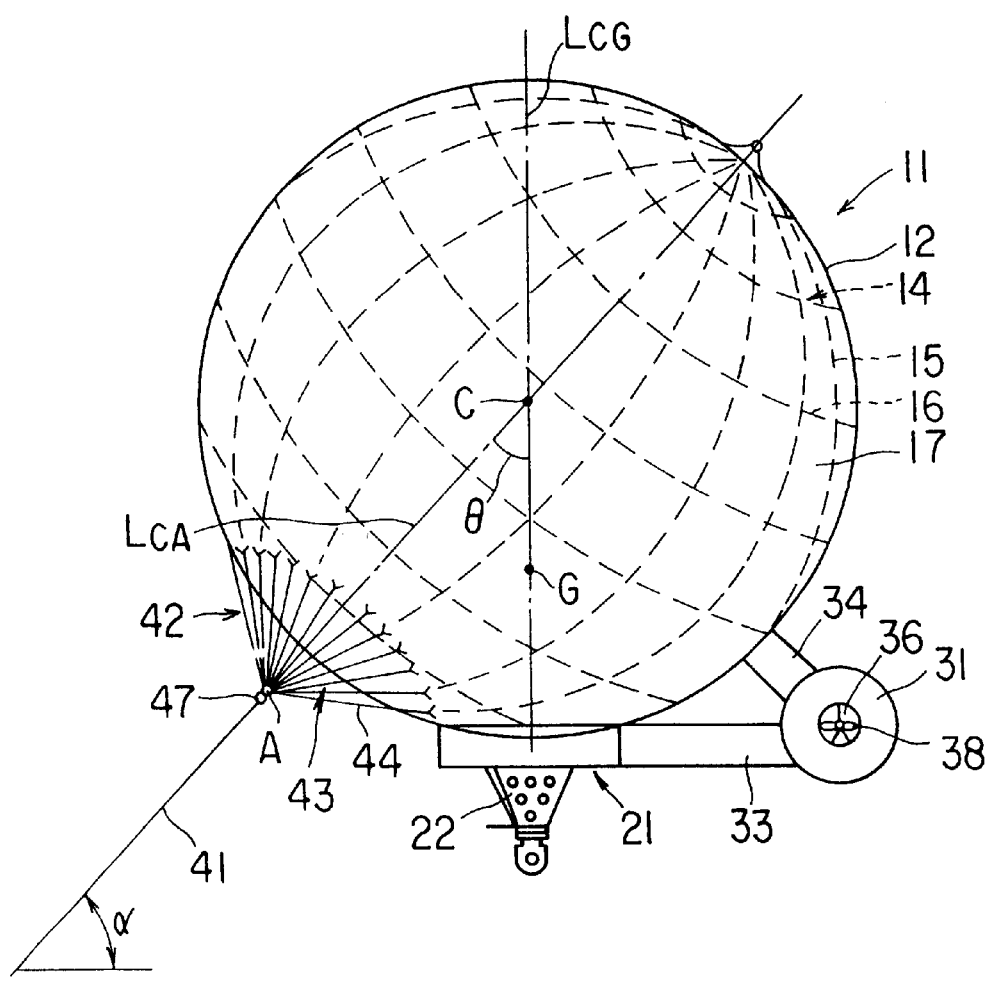
FIG. 1 is a side elevation of a tethered balloon according to this invention.
Figure 2:
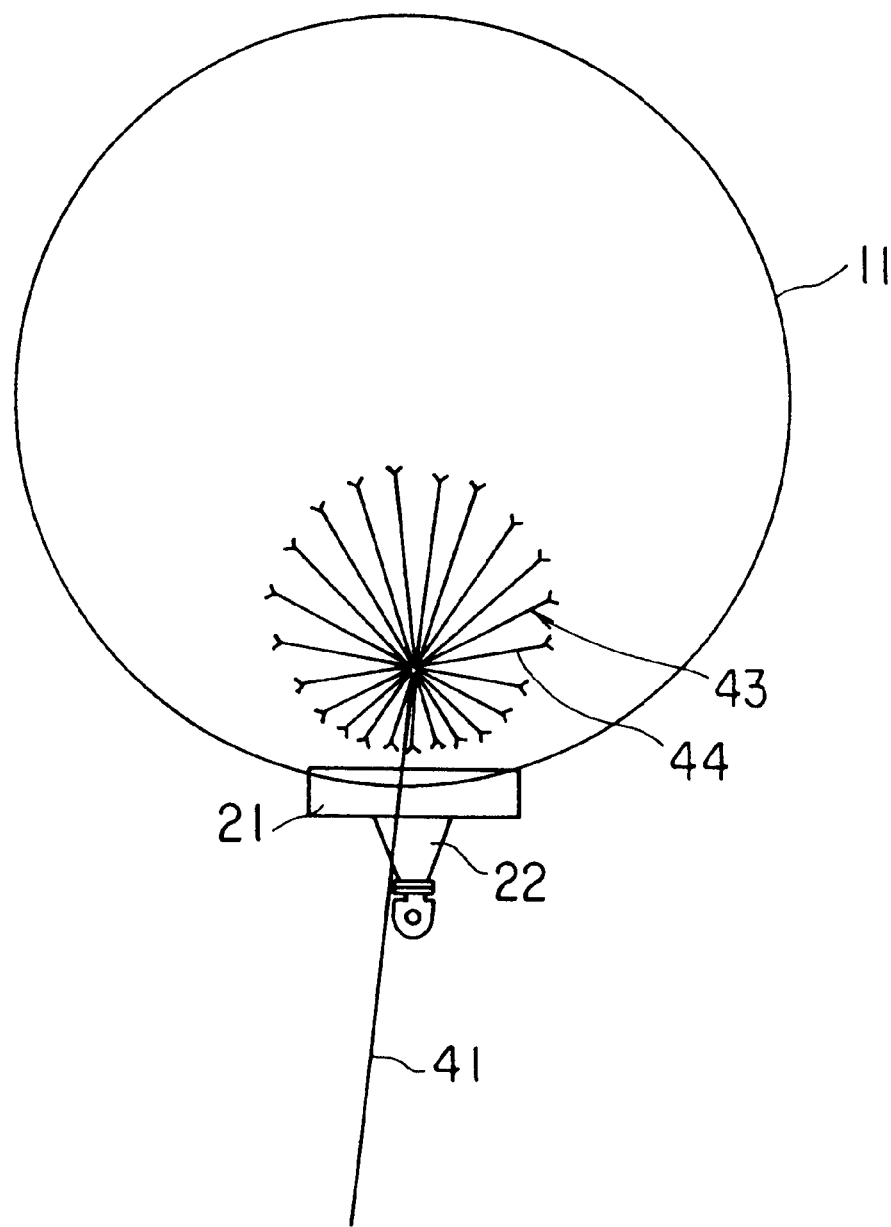
FIG. 2 is a front view of the balloon shown in FIG. 1.

FIGS. 1 and 2 show a tethered balloon according to this invention. A balloon 11 comprises a balloon proper 12, a gondola 21, a vertical stabilizer 31, a tether 41 and a tether holder 51.

The balloon proper 12 has a frame 14 made of multiple vertical and horizontal belts 15 and 16 that run along the meridional and latitudinal lines. The belts 15 and 16 are made of polyester. The frame 14 contains a double-walled air bag 17, with an inner and an outer wall being made of vinyl chloride and parachute fabric. The frame 14 and air bag 17 are collapsible and become spherical when they are inflated with a gas whose specific gravity is lower than that of the outside air, such as helium, hydrogen and warm air, and pressurized. The diameter of the balloon proper 12 is between approximately 3 and 30 m, depending on the use and buoyancy of the balloon, the weight of equipment mounted on the gondola 21, and other factors.

The gondola 21 is firmly attached to the bottom of the balloon proper 12 by means of multiple ropes (not shown). The gondola 21 has a clamping leg 22 to fasten a camera or other equipment in position. The weight of the gondola 21 and the equipment mounted thereon must be determined by considering the weight and buoyancy of the balloon proper 12. The overall weight of the balloon 11 (the sum of the weights of the balloon proper, gondola, mounted equipment, vertical stabilizer, tether, etc.) is commensurate with the buoyancy of the balloon proper 12. If the overall weight is too heavy, the real buoyancy (=buoyancy−overall weight)

becomes so small that the balloon 11 becomes unstable and the speed and time of ascent thereof become slower and longer. The appropriate overall weight of the balloon 11 is approximately 60 to 80 percent of the buoyancy thereof.

The vertical stabilizer 31 is disk-shaped. The vertical stabilizer 31 is attached to the balloon proper 12 by means of a horizontal arm 33 extending backward from the rear end of the gondola 21 and a tilt arm 34 projecting from the balloon proper 12. A round hole provided at the center of the vertical stabilizer 31 is fitted with a propeller 38. In windless conditions, the propeller 38 is rotated by an electric motor (not shown). Although the balloon 11 has a tendency to slowly rotate in the counterclockwise direction about a vertical axis (the central axis of the balloon $L_{CG}$), the propeller 38 prevents this rotation.

The tether 41 is connected to the balloon proper 12 via a connecting assembly 42. The connecting assembly 42 comprises a connecting net 43 made of multiple connecting ropes 44 that are attached to the periphery of a circle on the surface of the balloon proper 12 at one end and gathered together at the other end to form a conical shape. The cone has a bottom whose diameter is equal to approximately 20 to 60 percent of the diameter of the balloon proper 12 and a height that is equal to approximately 10 to 30 percent of the diameter of the balloon proper 12. The connecting ropes 44 are approximately 10 to 40 in number. The tether 41 is connected to the lower end of the connecting net 43 via a rotary joint 47. The connecting net 43 is placed opposite to the vertical stabilizer 31 with the gondola 21 in between. A straight line $L_{CA}$ connecting the center of the balloon proper 12 and the apex A of the connecting net A is inclined with respect to the central axis $L_{CG}$ of the balloon connecting the center C of the balloon proper 12 and the center of gravity G of the whole balloon. The angle of inclination θ is approximately 30 to 60 degrees. It is preferable to place the center of gravity G of the whole balloon, the vertical stabilizer 31 and the apex A of the connecting net 43 in the same plane. The tether 41 and connecting net 43 are made of Kevlar fiber (the trade name of an aramid fiber).

Figure 3:
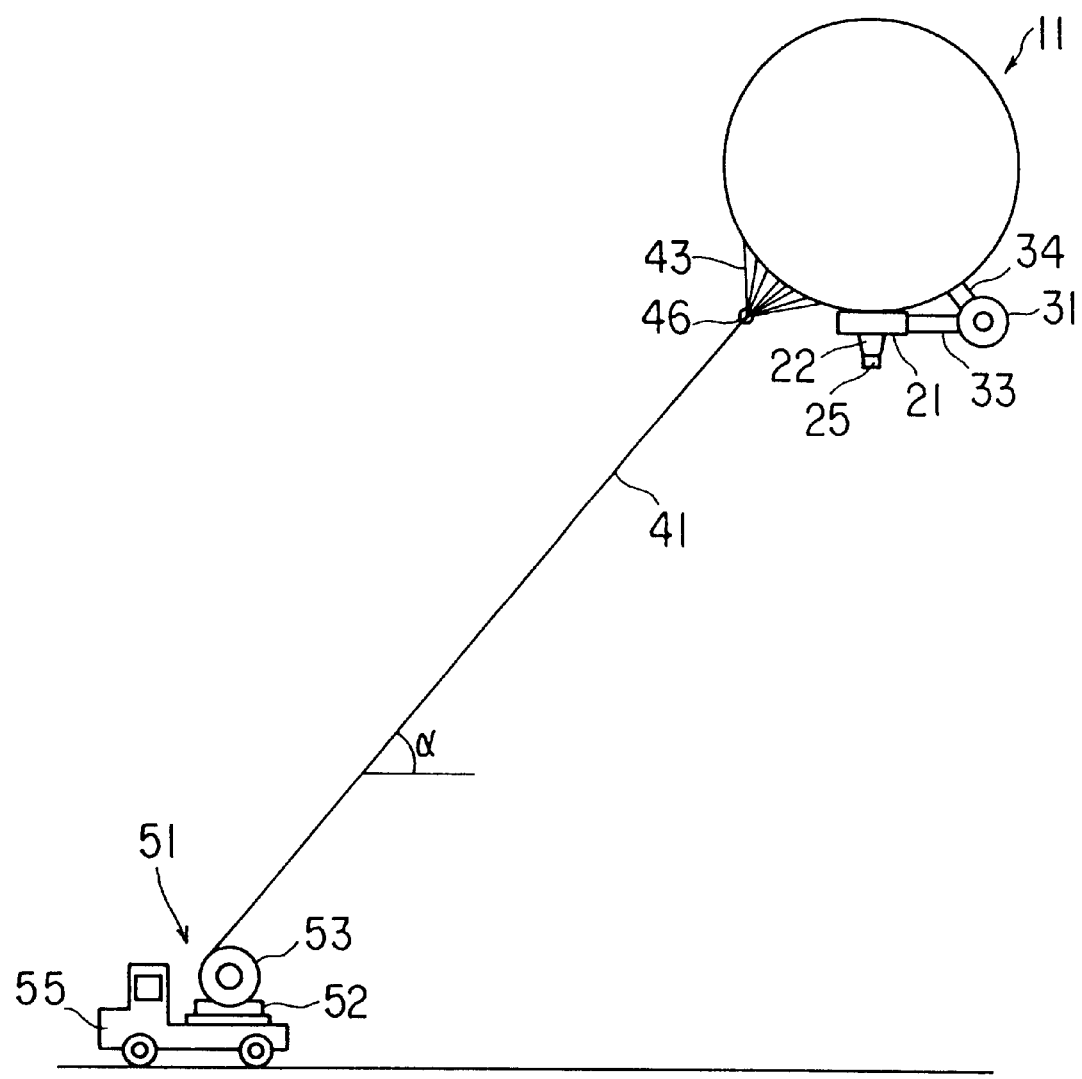
FIG. 3 schematically shows the balloon floating in the air.

The tether holder 51 has an electrically powered winch 52 mounted on a vehicle 55, as shown in FIG. 3. The electrically powered winch 52 has a drum 53 that takes up and pays off the tether 41.

The tether 41 carries a power cable, a communication cable and some other cables that connect the equipment on the balloon to the power supply, control unit and other devices (not shown) on the ground, as will be described later by reference to FIG. 4.

After a television camera 25, illuminating devices, advertising streamer and the like have been attached to the gondola 21, depending on the use of the balloon, the balloon 11 is allowed to rise and float in the air. In Japan, for example, the maximum height of the balloon 11 floating in the air is limited to 150 m by Aviation Law. When wind blows, the position of the balloon 11 becomes such that the vertical stabilizer 31 lies parallel to the direction of wind. As such, the balloon 11 remains stable transversely. When the center of gravity G of the whole balloon, the vertical stabilizer 31 and the apex A of the connecting net 43 are in the same plane, the balloon becomes more stable transversely. The balloon does not sway back and forth much because the straight line $L_{CA}$ connecting the center of the balloon proper and the apex of the connecting net is inclined with respect to the central axis $L_{CG}$ connecting the center of the balloon proper and the center of gravity of the whole balloon. The angle of inclination α of the tether 41 with respect to the surface of the ground varies with wind speed. The angle of inclination α of a balloon with a diameter of 3.5 m, for example, becomes 45 degrees when wind speed is 15 meters per second. Even then, the balloon does not sway back and forth much. When the tether 41 is inclined, an omnidirectional (covering 360 degrees) bird's-eye view picture can be taken, because the tether 41 and the connecting net 43 are entirely outside the field of vision of the camera 25. When there is no wind, the tether 41 hangs down vertically. Still, the tether 41 and the connecting net 43 are away from the central axis $L_{CG}$ of the balloon proper 12. Therefore, the tether comes into the field of vision of the camera when an omnidirectional bird's-eye view photograph is taken. Even so, the connecting net 43 remains outside the field of vision.

Figure 4:
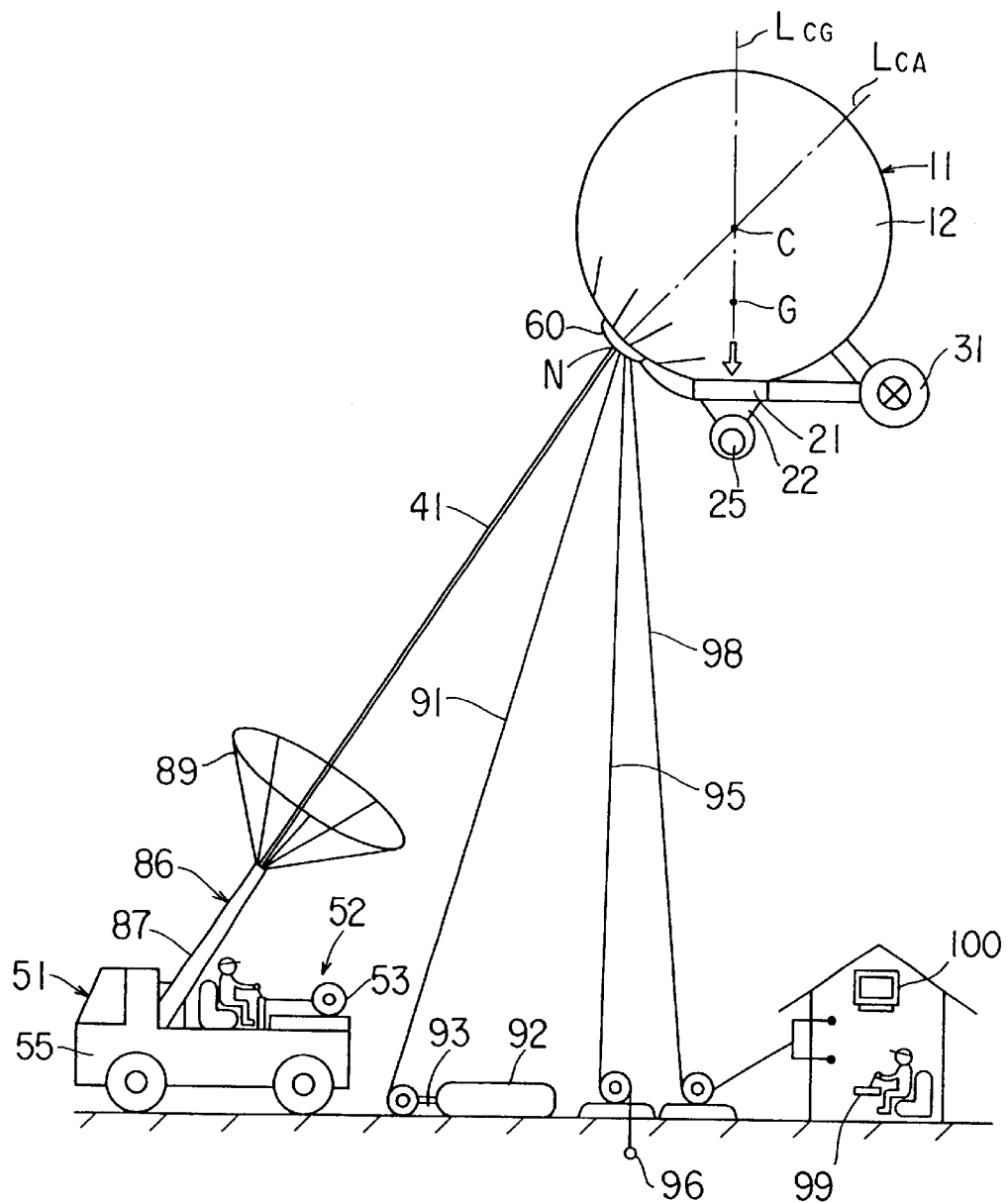
FIG. 4 schematically shows another embodiment of this invention comprising a tethered balloon and a tether holder.
Figure 5:
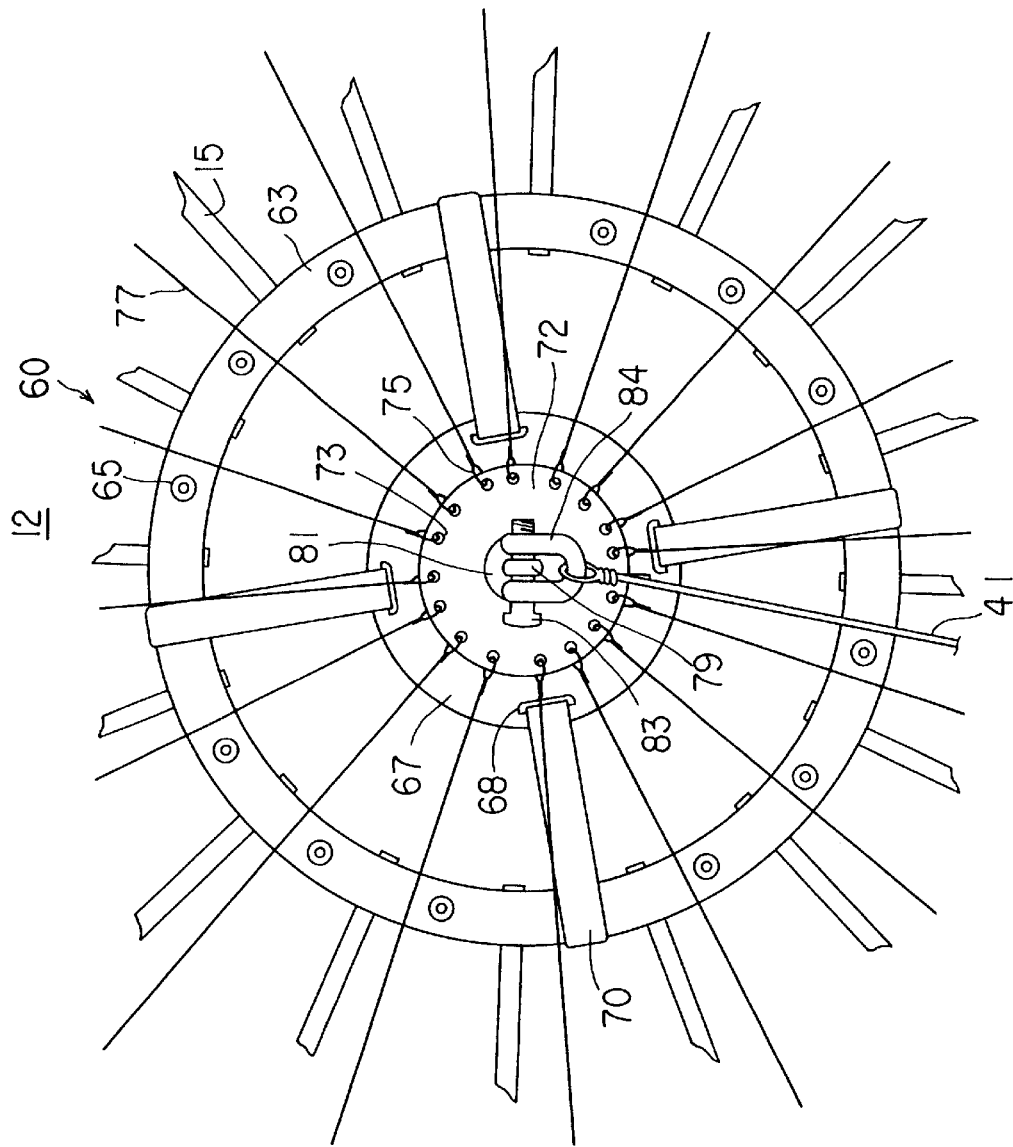
FIG. 5 is a bottom view showing details of a portion of the tethered balloon shown in FIG. 4 where the balloon proper and tether are connected.

FIGS. 4 to 6 show another embodiment of this invention, in which devises similar to those shown in FIGS. 1 to 3 are designated by similar reference characters, with detailed descriptions thereof omitted.

A connecting assembly 60 is placed opposite to the vertical stabilizer 31 with the gondola 21 in between, as shown in FIG. 4. A straight line $L_{CA}$ connecting the center of the balloon proper 12 and the center N of the connecting assembly is inclined with respect to the central axis $L_{CG}$ of the balloon connecting the center C of the balloon proper 12 and the center of gravity G of the whole balloon. The angle of inclination θ is approximately 30 to 60 degrees. It is preferable to place the center of gravity G of the whole balloon, the vertical stabilizer 31 and the center N of the connecting assembly in the same plane.

The connecting assembly 60 has top and bottom ring plates 62 and 63 of equal diameter, as shown in FIGS. 5 and 6. One end of each of the vertical belts 15 forming the frame 14 is inserted between the top and bottom ring plates 62 and 63 and folded back toward the top ring plate 62 (or toward the side of the balloon proper). The top and bottom ring plates 62 and 63, with the vertical belts 15 inserted therebetween, are fastened together by bolts 65. The folded back portions of the vertical belts 15 are stitched together. A holding plate 67 is placed under the bottom ring plate 63. One end of a holding belt 70 is folded back over the bottom ring plate 63 and the other end thereof is passed through a slit 78 in the holding plate 67 and folded back. The folded back portion of the holding belt 70 is stitched together. The holding plate 67 is attached to the bottom ring plate 63 via four holding belts 70. A bracing plate 72 is placed directly below the holding plate 67. The bracing plate 72 has many holes 73 that hold self-locking hooks 75 to which one end of bracing wires 77 is attached. The other end of the bracing wires 77 is fastened to each of the vertical belts forming the frame 14. An eyebolt 79 is passed through center holes (not shown) provided in the holding and bracing plates 67 and 72. The eyebolt 79 has a head 80 that prevents slip-off from the holding and bracing plates 67 and 72. The eyebolt 79 is fastened to the holding and bracing plates 67 and 72 by a nut 81. A clevis 84 is attached to a bolt 83 that is passed through a hole in the eyebolt 82, and an end of the tether 41 is tied to the clevis 84.

The holding and bracing plates 67 and 72 may be omitted from the connecting assembly 60. Then, the clevis 84 may be attached to a bracket fastened to the bottom ring plate 63.

A tether crane 86 is mounted on a light truck 55, as shown in FIG. 4. A balloon holding ring 89 is provided at an upper end of a jib 87 of a tether crane 86. The jib 87 of the tether crane 86 rotates about the base end thereof. The tether 41 is wound around a take-up drum 53 of a hydraulic winch 52 via the tether crane 55. When lowering the balloon 11 onto the ground, the hydraulic winch 52 is actuated to take up the tether 41. Then, the balloon 11 is pulled and fastened to a balloon holding ring 89. The balloon 11, thus fastened to the balloon holding ring 89, remains motionless and stable.

Though shown separately for the sake of simplicity, a helium supply tube 91, a power supply cable 95 and a communication cable 98 run upward along the tether 41 from the ground to the connecting assembly 60 of the balloon proper 12. The helium supply tube 91, which is connected to a helium cylinder 92 via a pressure regulating valve 93, automatically makes up for the loss of helium from the balloon proper 12. A power supply 96 supplies electricity through the cable 95 to a drive unit to rotate and actuate the television camera 25 attached to the gondola 21 and a motor to drive the propeller 38. A control unit 99 sends control signals to the television camera 25 through the communication cable 98 to control the motions of the camera, such as zooming and rotation of the camera proper for omnidirectional bird's-eye view photographing, from the ground. The television camera 25 sends image signals through the communication cable 98 to a television monitor 100 or a signal transmitter or a video recorder.

EXAMPLE

A tethered balloon of the type shown in FIGS. 1 and 2 was made according to the following specifications:

Diameter of the balloon proper: 8.8 m

Inflating gas: Helium

Inflating pressure: 40 mmAq

Buoyancy: 3,530 N

Overall weight of the balloon: 1,177 N (including 392 N of tether etc.)

Payload: 1,373 N

Real buoyancy: 981 N

The hydraulic winch of the tether holder was moved by a light truck. An omnidirectional photograph of topography was taken from a point 150 m above the ground level using a television camera attached to the gondola of the tethered balloon. The wind speed was 15 meters per second and the angle of inclination α of the tether with respect to the surface of the ground was approximately 60 degrees. The balloon swayed little both back and forth and transversely. The tether did not come into the field of vision of the television camera.

Even when wind speed exceeds 7 meters per second, the tethered balloons according to this invention remain stable and relatively motionless. Therefore, aerial bird's-eye view photographing, advertisements and shows are now possible even in the presence of winds. An omnidirectional picture can be taken without being hindered by the tether and connecting net, as well.

The balloon according to this invention can be flown on a lake or sea by using the tether holder mounted on a vessel, or by running a vehicle or a vessel.

What is claimed is:

1. A tethered balloon, comprising:

a spherical balloon proper to be inflated with a gas whose specific gravity is lower than that of outside air;

a gondola attached to said spherical balloon proper;

a vertical stabilizer attached to said spherical balloon proper;

a connector attached to said spherical balloon proper, said connector being positioned opposite to said vertical stabilizer with said gondola disposed in between, wherein a center of said spherical balloon proper and said connector form a straight line inclined with respect to a central axis of the tethered balloon connecting the center of said balloon proper and a center of gravity of the tethered balloon;

a tether connected to said connector; and a tether holder connected to said tether, said tether holder having a drum to take up and pay off said tether.

2. A tethered balloon according to claim 1, wherein said spherical balloon proper has a lower portion, and said gondola, said vertical stabilizer and said connector are all attached to said lower portion of said spherical balloon proper along a central plane of said spherical balloon proper.

3. A tethered balloon according to claim 1, wherein said connector comprises a conically shaped connecting net made of a plurality of connecting ropes which are attached to a periphery of a circle on an outer surface of said spherical balloon proper at one end and gathered together at another end.

4. A tethered balloon according to claim 1, wherein said connector comprises ring plates attached to a metal connector to which said tether is connected.

5. A tethered balloon according to claim 4, wherein said spherical balloon proper comprises:

a spherical frame having vertical and horizontal belts running in meridional and latitudinal directions, respectively, wherein said vertical belts are attached to said ring plates; and an air bag located within said spherical frame.

6. A tethered balloon according to claim 1, further comprising a camera attached to said gondola.

\* \* \* \* \*